(No Model.)
J. F. THEURER & P. FISCHER.
METHOD OF AND APPARATUS FOR PRODUCING AIR FREE CARBONIC ACID GAS.
No. 586,523. Patented July 13, 1897.
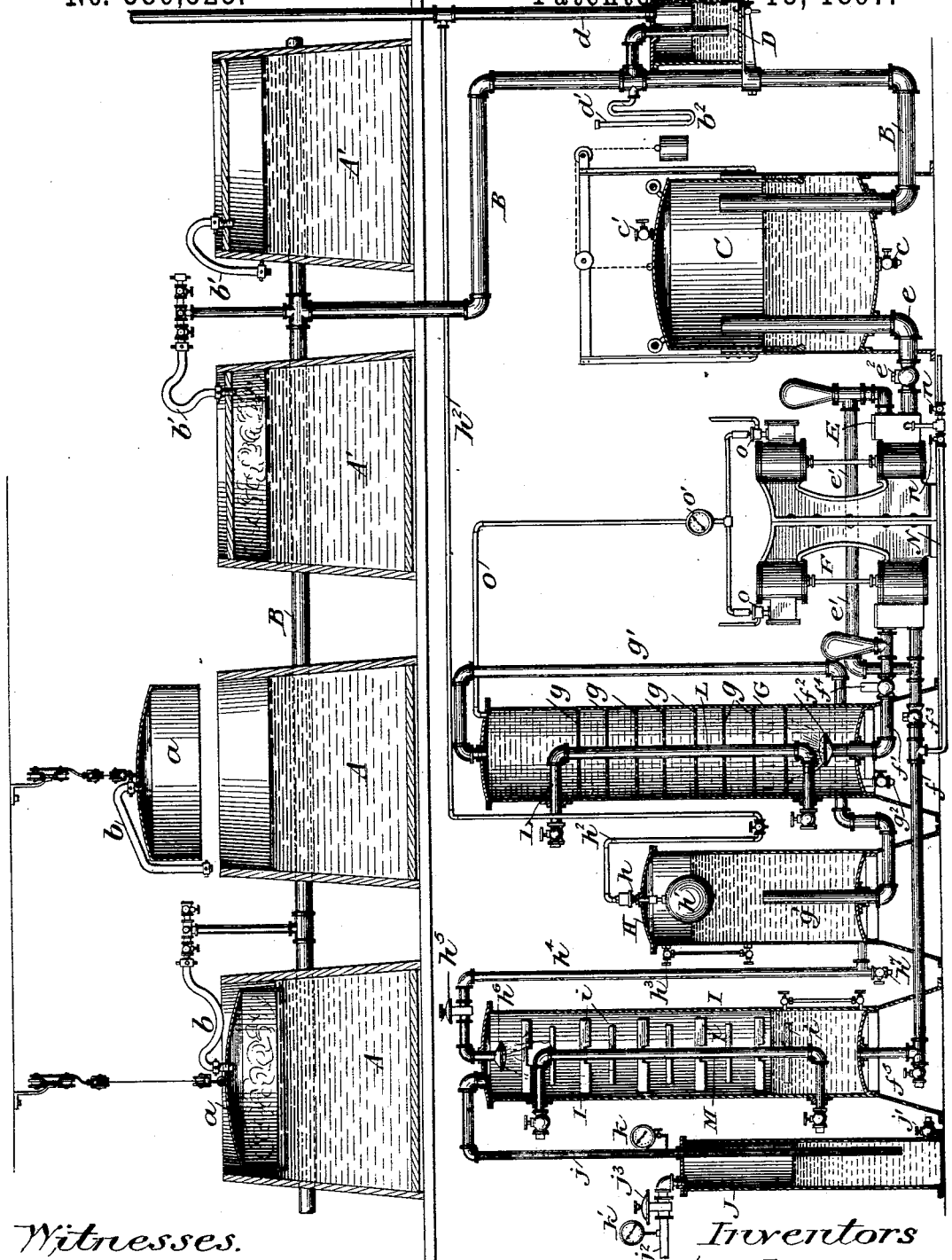
Witnesses.
C. E. Burdine,
D. E. Burdine.
Inventors
Jacob F. Theurer,
Paul Fischer,
by Dodge & Sons,
Associate Attys.

UNITED STATES PATENT OFFICE.

JACOB F. THEURER AND PAUL FISCHER, OF MILWAUKEE, WISCONSIN, ASSIGNORS TO THE PABST BREWING COMPANY, OF SAME PLACE.

METHOD OF AND APPARATUS FOR PRODUCING AIR-FREE CARBONIC-ACID GAS.

SPECIFICATION forming part of Letters Patent No. 586,523, dated July 13, 1897.

Application filed February 23, 1894. Serial No. 501,136. (No model.)

*To all whom it may concern:*

Be it known that we, JACOB F. THEURER and PAUL FISCHER, of Milwaukee, in the county of Milwaukee and State of Wisconsin, have invented certain new and useful Improvements in Methods of and Apparatus for Producing Air-Free Carbonic-Acid Gas; and we do hereby declare that the following is a full, clear, and exact description of the invention, which will enable others skilled in the art to which it pertains to make and use the same, reference being had to the accompanying drawings, and to the letters of reference marked thereon, which form a part of this specification.

Our invention has for its object the separation or removal of air from carbonic-acid gas, whereby such gas may be fitted for the carbonation of beer and other liquids in which air would be objectionable.

Carbonic-acid gas, however produced, contains naturally a greater or less percentage of air, and even compressed to a state of liquefaction is found to contain 0.1 to 0.4 per cent. of air, which amount renders it unsuitable for carbonating beer and various other liquids; hence the necessity of separating the air therefrom.

Our invention is based upon the fact that certain liquids, such as water or an aqueous solution of alcohol or of glycerin, when subjected to pressure or reduced to low temperature, possess the property of absorbing or taking up considerable quantities of carbonic-acid gas ($CO_2$) and holding the same in mechanical mixture or solution, though substantially or practically incapable of taking up or holding air. It is not meant to be asserted that by reason of pressure or by lowering the temperature of such liquids air is expelled therefrom, but that such pressure and lowering of temperature greatly increase the capacity of the liquid to absorb carbonic-acid gas, while not appreciably or materially increasing its capacity of absorbing air.

Air and water form when agitated a loose mechanical mixture, from which the air freely escapes when the liquid becomes quiet. Carbonic-acid gas forms with water a far more intimate mechanical mixture, specifically designated a "mechanical solution," the formation of which is greatly facilitated and increased by pressure. From these facts it follows that the separation of air from the gas, which is the object primarily in view, is due to the circumstance that while the air forms a loose mechanical mixture with water or other liquid the carbonic-acid gas forms an intimate mixture or solution, and the air readily separates from the liquid when the latter is at rest, while the gas continues bound therein, thus permitting the water and gas to be drawn off free from air or the air to be withdrawn from the gas-charged water or liquid.

By the term "mechanical mixture or solution" we mean that mingling which takes place through the mere intimate association of molecules without any chemical union or reaction, or, in other words, a mingling in which each ingredient or constituent preserves its identity and peculiar characteristics, as contradistinguished from a chemical combination resulting in a substance or compound different from any of the separate constituents of which it is composed.

Water or an aqueous solution of acohol or of glycerin, and probably certain other aqueous solutions, will, as stated, absorb and hold a considerable quantity of carbonic-acid gas if subjected to sufficient pressure or reduced to a low temperature; but if the pressure be relieved or the temperature be raised the carbonic-acid gas is liberated and may be conveyed away with but a very small percentage of moisture present in it.

If desired, both expedients, the subjection to pressure and lowering of temperature, may be resorted to to effect the absorption or taking up of the gas, and, conversely, the pressure may be relieved and the temperature raised to effect a release of the gas; but it is deemed important to effect the variations in pressure whether the temperature be varied or not. Upon these properties of water and certain aqueous solutions our improved process or method of operation depends, the gas being liberated by merely permitting the liquid to resume or approximate its normal state or condition.

In practice it is found advisable to subject the liquid to a pressure of from one hundred and seventy-five to two hundred pounds, because its capacity for absorbing carbonic-acid gas is increased in a progressing ratio with increase of pressure, and because this enables us to reduce the pressure sufficiently to liberate large quantities of the gas under pressure sufficient for direct carbonation of beer and other liquids. If the gas were liberated at atmospheric pressure or below, it would need to be again compressed under from forty to fifty pounds pressure, preparatory to carbonating beer and other liquids at from fifteen to twenty-five pounds, as is customary under this system. By employing the same liquid continuously we are enabled to retain in the liquid and to return to the saturater all gas not liberated at the pressure of forty to fifty pounds stated, and thus all waste is avoided. A fresh supply of liquid would inevitably introduce a certain additional quantity of air, which is avoided by using the liquid continuously without exposure to the atmosphere.

Our method is to be distinguished particularly from those prior processes in which substances possessing chemical affinity for carbonic-acid gas have been employed to absorb the same, but which substances enter into chemical combination with the gas and produce a compound essentially different from any of its ingredients or constituents. Such compounds require special subsequent treatment to cause or enable them to release and part with their gas, whereas we avoid such aftertreatment and greatly simplify the whole operation.

In practice we find it convenient to collect the gas from fermenting vats and vessels, and in our drawings we have represented our apparatus as connected or combined therewith; but it is to be understood that the source from which the gas is obtained is immaterial, provided it be such as will supply gas free from noxious properties incapable of ready elimination.

The accompanying drawings illustrate, partly in vertical section and partly in elevation, apparatus suitable for the purposes of our invention.

Referring to the drawings, A A designate open and A' A' closed fermenting vessels, such as are commonly employed in breweries for the fermentation of beer.

$a\ a$ are bells adapted to be lowered from overhead ways and supported in the open tops of the fermenting vessels A A, with their edges projecting into the wort or beer contained therein, so as to catch the gas produced by the fermentation of said wort or beer.

B is a pipe provided with valve-controlled branches and hose connections $b$ and $b'$ for attachment to the bells $a\ a$ of the open fermenting vessels or to the upper parts of the closed fermenting vessels.

C is a telescoping or expansible gas holder or receiver into which the pipe B leads. It is provided at the bottom with a valve-and-hose connection $c$ for drawing off and renewing the liquid and at the top with a vent-cock $c'$, by means of which air entrapped in the upper part of the gas-receiver may be discharged. At some convenient point between the gas-receiver and fermenting vessels the pipe B is connected, through a water-lock trap D or other suitable vent device, with a wastepipe $d$, through which surplus gas collected from the fermenting vessels is allowed to escape when the pressure in the gas-receiver rises above a certain point.

The pipe B or some of its connections may be provided with a pressure-gage $d'$ to indicate the gas-pressure in the fermenting vessels and in the gas-receiver with which said pipe communicates.

The trap D is provided, as shown, with a glass gage to indicate the level and condition of the liquid therein and at the bottom with a valve and connection for withdrawing and renewing the liquid.

E is a pump the suction-pipe $e$ of which communicates with the upper part of the gas-receiver C and the discharge-pipe $e'$ of which connects with the suction-pipe $f$ of a similar pump F.

G is a closed vessel which we designate the "saturater." It is provided at intervals with perforated plates $g\ g$ and is connected at or near the bottom with the pump F by its discharge-pipe $f'$, said pipe being provided at its discharging end inside of the saturater with a perforated head $f^2$. The suction-pipe $e$ of the pump E has a check-valve $e^2$ opening toward the pump. The suction-pipe $f$ of pump F has a check-valve $f^3$ opening toward the pump outside of the connection of the pipe $e'$ therewith, and the pipe $f'$ has a safety-valve $f^4$ to prevent the pump from accidentally producing overpressure in the saturater. The saturater is provided at the bottom with a valve-and-hose connection $g^2$ for draining and cleansing the same from time to time, as required.

A pipe $g'$ connects the upper part of the saturater with a closed vessel H, which we designate the "air-separator." The air-separator is provided at the top with an air-escape valve $h$, which is connected by a pipe $h^2$ with the waste-pipe $d$, and a float $h'$ is connected with and arranged to automatically open said valve when the liquid in the air-separator falls below a certain level. A glass gage $h^3$, connected with the upper part of the air-separator, affords means of observing the level and condition of the liquid therein.

I is another closed vessel, designated by us the "liberator," the upper part of which is connected by a pipe $h^4$ with the lower part of the air-separator. This pipe is provided with a reduction-valve $h^5$ and at its discharging end inside of the liberator with a perforated head or sprinkler $h^6$. It is also provided at the lowest point therein with a valve $h^7$ to facilitate draining and cleansing the air-separator. The suction-pipe $f$ of pump F connects with the bottom or lower part of the liberator and is provided with a valve $f^5$ for draining and cleansing the liberator. Baffle or deflecting plates $i\ i$ are placed at intervals inside of the liberator to spread and agitate the liquid entering through pipe $h^4$.

J is a washer or cleansing device consisting of a closed vessel, which is partially filled with a suitable liquid, and is connected with the upper part of the liberator by a pipe $j$, which projects at its discharging end into the liquid contained in the washer. The washer is provided at or near the bottom with a valve-and-hose connection $j'$, by means of which the cleansing liquid may be withdrawn and renewed as occasion may require.

$j^2$ is a gas-eduction pipe leading out of the upper part of the washer and provided, when it is desired to deliver the gas under a certain pressure, with a reduction-valve $j^3$. Pressure-gages $k$ and $k'$ may be provided for indicating the pressure in the liberator and washer and in the gas-delivery pipe $j^2$ and its connections beyond the reduction-valve $j^3$.

L designates a cooling pipe or coil in the saturater G, having suitable valve-controlled connections, and M designates a heating-coil in the liberator having similar valve-controlled connections.

N is a pipe provided with valves $n\ n$, by means of which the suction-chamber of pump E may be connected either with the pipe $f$ or with a water-service pipe or any other source of water-supply.

O represents a pipe connecting the saturater with valve-controlling devices $o\ o$ for controlling the supply of steam or other actuating medium to the pumps E and F, according to the pressure within the saturater G. A pressure-gage $o'$ may be connected with this pipe O, as shown, or directly with the saturater to indicate the pressure therein.

In carrying out our process by means of the hereinbefore-described apparatus its operations may be explained as follows: At the proper stage of fermentation, when carbonic acid is being rapidly generated, one or any number of fermenting vessels are connected by the hose-sections $b$ or $b'$ with pipe B, which conduct the gas collected from the fermenting vessels into the receiver C. From the receiver it is drawn by pump E and forced into the suction-pipe $f$ of pump F, which in turn forces it, together with the absorbing liquid drawn through pipe $f$ from the liberator I, into the saturater G through the perforated head $f^2$. Passing upwardly through the saturater and the perforated plates $g\ g$ the gas and absorbing liquid are thoroughly agitated, thereby facilitating the absorption of the gas by the liquid. Water or any other suitable cooling medium is drawn through the pipe N from the liberator I or any other convenient and suitable source of supply into the suction side of pump E and reduces the clearance-space of the pump, as well as serving to reduce the temperature of the gas which is raised by the compression of the pump. The small amount of water or other liquid thus drawn into the pump E is forced by it, with the gas, into the suction side of the pump F, by which it is in turn forced into the saturater. The temperature of the contents of the saturater may, when necessary or desirable, be kept down by passing a cooling medium through the pipe or coil L. From the top of the saturater the liquid charged with gas and containing more or less impurities, including air, is conducted through pipe $g'$ into the air-separator H, in the upper part of which the unabsorbed air is collected. When a sufficient quantity of air accumulates to lower the level of the liquid to a certain point, the float $h'$ descends, opening the relief-valve $h$ and allowing the air to escape through pipe $h^2$ until the liquid rises sufficiently to lift the float and close the valve. The liquid, saturated principally with the carbonic-acid gas and small quantities of soluble impurities, is conducted from the air-separator, through pipe $h^4$ and the reduction-valve $h^5$ therein, into the top of the liberator I, in which it descends in spray or a finely-divided state over the deflecting-plates $i\ i$, by which it is spread and thoroughly agitated. Being subjected to less pressure in the liberator by reason of its passage through the reduction-valve $h^5$, the gas is liberated from the liquid charged therewith and accumulates in the top of the liberator-chamber, from which it is conducted through pipe $j$ into the washer J. The liquid from which the gas is thus separated is drawn from the bottom of the liberator by the pump F through pipe $f$, and is thus caused to circulate through the apparatus, absorbing a certain quantity of gas in the saturater and liberating it in the liberator during each passage. To facilitate the separation of the gas from the charged liquid, a heating medium may be passed through the pipe or coil M. The absorbing liquid employed to take up the gas while the unabsorbed air is separated therefrom becomes contaminated with impurities after continued use and must be renewed from time to time. In passing through the washer the remaining impurities carried with the gas are removed therefrom, the washing liquid being supplied with certain chemicals, such as permanganate of potassium or sulfuric acid, when necessary or desirable to destroy or neutralize organic gases or other impurities mingled with the carbonic-acid gas. From the washer the gas is withdrawn through a pipe $j^2$ for immediate use or to be compressed and stored in cylinders or drums or other receptacles for transportation or future use. When the gas is required for use at or under a certain pressure, the delivery-pipe $j^2$ may be provided with a reduction-valve $j^3$.

For the gas-absorbing liquid pure water and various other liquids, such as alcohol or glycerin in aqueous solution, may be employed. The absorbing liquid may also be supplied with certain chemicals, such as permanganate of potassium and sulfuric acid, hereinbefore mentioned, to act upon and destroy or neutralize the impurities mixed with the carbonic-acid gas. The pressure to be produced and maintained in the saturater and liberator will be determined by varying conditions and circumstances, such as temperature, the condition of the unpurified gas, the pressure at which it is to be delivered from the apparatus, &c.

Various changes in the details of the apparatus and in the mode of its operation may be made within the spirit and intended scope of our invention, as, for instance, one instead of two pumps may be employed to produce the required circulation of the gas and absorbing liquid and to maintain the requisite pressure in the apparatus, and in place of the cooling and heating coils the saturater and liberator may be provided with jackets, or the cooling and heating connections may be either or both dispensed with, the employment either of different pressures or of different temperatures being contemplated by us for producing or facilitating the requisite absorption and subsequent release of the gas by the liquid, although we prefer to utilize both difference of pressure and difference of temperature.

We claim—

1. The herein-described method of obtaining carbonic-acid gas free from air, which consists in introducing mingled gas and air under pressure into a chamber containing a liquid capable of mechanically absorbing but incapable of chemically uniting with carbonic-acid gas, and substantially incapable of taking up air, whereby the gas is separated from the air; withdrawing the liquid containing the gas thus freed from air into another chamber; and liberating the gas from said liquid by reducing its pressure to a point materially below that at which absorption is effected but still above atmospheric pressure, substantially as and for the purposes set forth.

2. The method of obtaining carbonic-acid gas free from air, which consists in introducing mingled gas and air under pressure into a chamber containing a liquid capable of mechanically absorbing but incapable of chemically uniting with carbonic-acid gas, and substantially incapable of absorbing air, whereby a separation of the gas and air is effected; permitting the air thus segregated to escape; withdrawing the liquid containing the gas thus freed from air into another vessel; and finally liberating the gas from said liquid by reducing the pressure thereon to a point still above atmospheric pressure, substantially as and for the purpose set forth.

3. The method of producing air-free carbonic-acid gas, which consists in introducing mingled air and gas under pressure into a chamber with a liquid which is capable of mechanically absorbing but is incapable of chemically uniting with carbonic-acid gas, and is substantially incapable of absorbing air; whereby the gas is separated from the air and is bound and retained in the liquid, and the air is excluded therefrom; then withdrawing the liquid with its contained gas into another chamber; liberating the gas therefrom by reducing the pressure in the latter chamber to a point still above atmospheric pressure; and continuously returning the absorbing liquid into the first vessel, substantially as and for the purposes set forth.

4. In an apparatus for separating air from carbonic-acid gas, the combination of a gas-supply pipe or holder; a saturater; a liberator; pipes connecting the supply pipe or holder, the saturater and the liberator; and a return-pipe for conveying liquid from the liberator back to the gas-supply pipe; whereby the liquid is caused to circulate continuously through the apparatus without being exposed to the external atmosphere.

5. In apparatus for separating air from carbonic-acid gas, the combination of a saturater, a liberator connected therewith, a pump having a gas-supply connection and connected on the force side with the saturater and on the suction side with the liberator, whereby it is adapted to produce a continuous circulation of liquid through the saturater and liberator and to supply gas to the saturater under the required pressure, a pressure-reducing device between the saturater and liberator, and an air-separating device connected with the saturater, and comprising an escape-valve and a float arranged to operate said valve according to the varying level of liquid, substantially as and for the purposes set forth.

6. In apparatus for separating air from carbonic-acid gas, the combination of a saturater having a gas-supply connection, an air-separating chamber connected therewith and provided at or near the top with a float-valve and air-vent, and a liberator connected with the lower part of said chamber, substantially as and for the purposes set forth.

7. In apparatus for separating air from carbonic-acid gas, the combination of a saturater, a liberator connected therewith, a liquid-pump connected on the suction side with the liberator, and on the force side with the saturater, a gas-pump having a gas-supply connection on the suction side and connected on the force side with the suction side of the liquid-pump, and an air-separating device connected with the saturater, substantially as and for the purposes set forth.

8. In apparatus for separating air from carbonic-acid gas, the combination with a saturater, an air-separating device and a liberator connected therewith, of a liquid-pump connected on the suction side with the liberator, and on the force side with the saturater, a gas-pump having a gas-supply connection on the suction side and connected on the force side with the suction side of the liquid-pump, and a liquid-supply connection with the suction side of the gas-pump, substantially as and for the purposes set forth.

9. In apparatus for separating air from carbonic-acid gas, the combination with a saturater, an air-separating device and a liberator connected therewith, of a pump connected on the suction side with a source of gas and with the liberator, and on the force side with the saturater, and a pressure-regulated valve controlling the supply of the actuating medium to the pump and connected with the saturater, substantially as and for the purposes set forth.

10. In apparatus for separating air from carbonic-acid gas, the combination of a saturater provided with one or more perforated plates or partitions between its inlet and outlet, an air-separating device connected therewith, a liberator connected at its upper end with said saturater and provided with a number of deflecting-plates, a pressure-reducing device in the connection between the saturater and liberator, a gas-supply connection with the saturater, and a gas-delivery connection with the upper part of the liberator, substantially as and for the purposes set forth.

11. In apparatus for separating air from carbonic-acid gas, the combination of a saturater provided with a cooler, an air-separating device connected with said saturater, a liberator connected with said saturater and provided with a heater, and a pump connected with the saturater and with a source of unpurified gas, substantially as and for the purposes set forth.

In testimony that we claim the foregoing as our own we affix our signatures in presence of two witnesses.

JACOB F. THEURER.
PAUL FISCHER.

Witnesses:
  CHAS. L. GOSS,
  RICHD. BIRKHOLZ.